(12) United States Patent
Douthit (10) Patent No.: US 6,239,507 B1
(45) Date of Patent: May 29, 2001

(54) WIND POWERED MACHINE

(76) Inventor: Harry Douthit, 3433 Browns Creek Rd., The Dalles, OR (US) 97258

( * ) Notice: Subject to any disclaimer, the term of this patent is extended or adjusted under 35 U.S.C. 154(b) by 0 days.

(21) Appl. No.: 09/364,569

(22) Filed: Jul. 30, 1999

(51) Int. Cl.[7] .................................................. F03D 9/00
(52) U.S. Cl. ................................... 290/55; 416/132 B
(58) Field of Search ................................. 290/55, 54, 44;
415/4.1, 151; 416/11, 132 B, 197 A, 243,
223 R; 439/12; 52/246, 723.1, 726.3, 737.4

(56) References Cited

U.S. PATENT DOCUMENTS

| | | | |
|---|---|---|---|
| D. 305,419 | * 1/1990 | Korneski | D13/3 |
| 455,858 | 7/1891 | Pepper | 416/41 |
| 648,442 | * 5/1900 | Scott | 415/4.1 |
| 705,922 | * 7/1902 | Gran | 415/2.1 |
| 757,800 | 4/1904 | Williams | 290/55 |
| 1,321,415 | 11/1919 | Brown | 416/118 |
| 1,333,987 | 3/1920 | McManigal | 415/4.1 |
| 1,935,097 | * 11/1933 | Nelson | 415/4.2 |
| 2,542,522 | 2/1951 | Hings . | |
| 2,874,546 | * 2/1959 | Fox | 405/250 |
| 3,988,072 | 10/1976 | Sellman | 415/2.1 |
| 4,005,947 | * 2/1977 | Norton et al. | 416/197 A |
| 4,084,918 | * 4/1978 | Pavlecka | 415/1 |
| 4,127,356 | 11/1978 | Murphy | 415/4.1 |
| 4,191,505 | * 3/1980 | Kaufman | 415/2.1 |
| 4,237,384 | * 12/1980 | Kennon | 290/55 |
| 4,330,714 | 5/1982 | Smith | 290/55 |
| 4,606,697 | * 8/1986 | Appel | 415/4.4 |
| 4,678,923 | * 7/1987 | Trepanier | 290/55 |
| 4,715,776 | 12/1987 | Benesh | 415/4.1 |
| 5,009,569 | 4/1991 | Hector, Sr. et al. | 415/4.1 |
| 5,263,297 | * 11/1993 | Kim | 52/723.1 |
| 5,350,273 | 9/1994 | Hector, Sr. et al. | 415/4.1 |
| 5,472,311 | * 12/1995 | Davis | 415/4.1 |
| 5,518,362 | 5/1996 | Kivilammi | 415/2.1 |
| 5,923,114 | * 7/1999 | Senni | 310/232 |
| 5,969,430 | * 10/1999 | Forrey | 290/54 |

* cited by examiner

Primary Examiner—Joseph Waks
(74) Attorney, Agent, or Firm—Klarquist Sparkman Campbell Leigh & Whinston, LLP (57) ABSTRACT

A wind-powered machine for producing energy includes a support frame, a rotor having a plurality of vanes, the rotor having a wind gathering face side and an opposed rear side, and an infeed funnel for channeling wind to the face side of the rotor and increasing the speed of the wind. A rear wind deflector captures wind passing over the rotor and deflects it downwardly to vanes on the rear side of the rotor. A turntable mounts the rotor, infeed funnel, and rear wind deflector to permit such to be directed properly into the wind. A generator connected to the rotor produces electrical energy which is transmitted through a rotational connection to electrical storage medium.

13 Claims, 8 Drawing Sheets

WIND POWERED MACHINE

BACKGROUND OF THE INVENTION

The present invention relates to a wind-powered machine for producing energy, and more particularly to such a machine with has improved mechanism for increasing its efficiency and durability.

Man has attempted to harness the force of the wind to produce working power or energy. However, it has been found that it is possible through new innovations to improve the efficiency, reliability, and durability of such equipment.

In present day culture electrical energy use continues to rise and sources for production of such energy, such as fossil fuel, nuclear reactors, hydropower, etc. are limited resources. One source that has yet to be fully tapped is wind powered energy generation.

Several attempts have been made in the past to harness wind power for electrical generation but these have often been less successful than hoped for due to high costs, low efficiency, and lack of reliability and durability.

It is an object of the present invention to provide an efficient means to extract energy from the wind. Another object is to provide a wind-powered machine for producing energy that effectively channels large volumes of air to a rotor to efficiently use available wind. A further object is to provide a machine that is mounted on a unique turntable, or pivot, mechanism permitting the rotor to be faced into the wind. Another object of the invention is provide a unique mounting for the rotor and wind deflectors and to provide a rotatable coupling through which electrical energy may be passed from a generator driven by the rotor to external storage or transmission means. Yet another object the invention is to provide a low cost, high efficiency, reliable and durable wind-powered machine for producing energy.

SUMMARY OF THE INVENTION

In a preferred embodiment of the apparatus of the present invention a rotor, with wind gathering vanes is mounted for rotation on a pivot mounting, with an infeed funnel directing wind into the rotor. A rear wind deflector overlying the rear side of the rotor captures wind passing over the rotor and deflects it downwardly to vanes on the rear side of the rotor.

The rotor of a preferred embodiment may comprise a pair of laterally spaced opposed enclosing sides, with a vane on the rotor extending between the sides and having a cross-sectional configuration, as view along the line parallel to axis rotation of the rotor, which is either sinusoidal or airfoil shaped. In the sinusoidal configuration the vane has a first edge followed in the direction of rotor rotation by a concave generally inwardly facing surface and a second edge led by a concave generally radially outwardly facing surface.

The pivot mounting, or turntable, may include a horizontally disposed annular first member having upper and lower face surfaces, and a second member contiguous the first member with bearing means interposed between the second member and the upper and lower face surfaces of the first member to support the second member against vertical movement relative to the first member but allowing rotation of the second member and the rotor and infeed funnel mounted thereon.

A support for the turntable includes a plurality of upright posts, which may be imbedded in the ground and are filled with a cementitious material with an elongate reinforcing rod extending therethrough.

A rotational coupling, or connector, is provided through which electrical energy may be passed from a generator driven by the rotor to external storage or transmission means.

DETAILED DESCRIPTION OF PREFERRED EMBODIMENT

Referring to the drawings, and first more particularly to FIGS. 1–5, at 10 is indicated generally a wind powered machine according to the present invention for producing energy. The machine includes a supporting frame 12 atop which is mounted a ring-like pivot mounting, or turntable, 16. Mounted on the turntable for rotation therewith is a wind-powered rotor 18, an infeed funnel 20 adapted to channel wind to rotor 18, a rear wind deflector 22, and a positioning fin 26 operable to turn the rotor and funnel to keep such directed into the wind.

Figure 9:
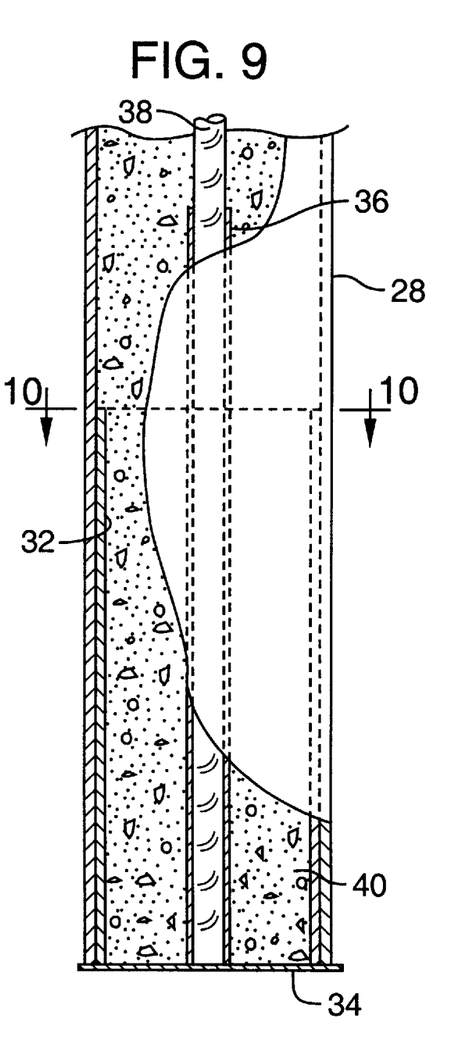
FIG. 9 is an enlarged cross-sectional view taken generally along the line 9—9 in FIG. 1.
Figure 10:
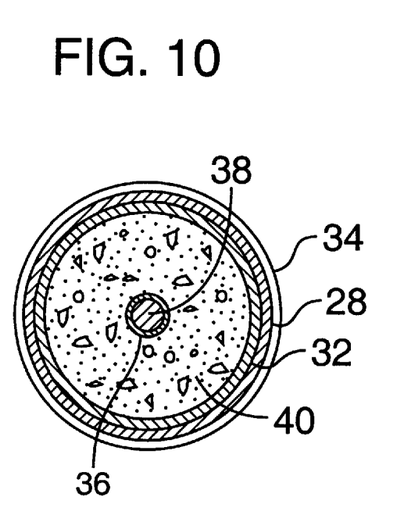
FIG. 10 is a view taken generally along the line 10—10 in FIG. 9.

Describing support 12, it includes a plurality of upright hollow cylindrical posts 28, the lower portions of which are imbedded in the ground 30. The upper portions of posts 28 which extend a distance above ground level to support the wind-powered machine at an elevation for efficiently gathering wind. Referring to FIGS. 9 and 10, will be seen that the lower end of a cylindrical pipe post 28 has a reinforcing sleeve 32 inserted therein and extending a short way upwardly from the bottom thereof. The sleeve and post are welded together with their lower ends contiguous. A base plate 34 has a smaller diameter sleeve 36 welded to the center of the base plate 34 and extending upwardly therefrom. Sleeve 36 is adapted to receive the lower end of a long section of reinforcing bar, or rod, 38.

The support post is prepared by cutting the round steel base plate 34, slightly larger than the external diameter of post 28. Sleeve 36, on the order of 1-inch diameter and 20 inches long is welded at its bottom to the center of the base plate. Prior to attaching the base plate 34 to post 28, reinforcing sleeve 32 is inserted in the bottom of the post 28 and the post 28 and sleeve 32 are welded together at the bottom. The post may be of a 6 inch diameter steel pipe of approximately 40 feet in length, and the reinforcing sleeve 32 may be on the order of 5 inches in internal diameter and 15 inches in length.

The lower end of the reinforcing bar 38 has its ridges ground off for a length of 20 inches at the bottom, and this section is inserted into sleeve 36. The base 34 then is welded to the bottom of post 28.

Figure 1:
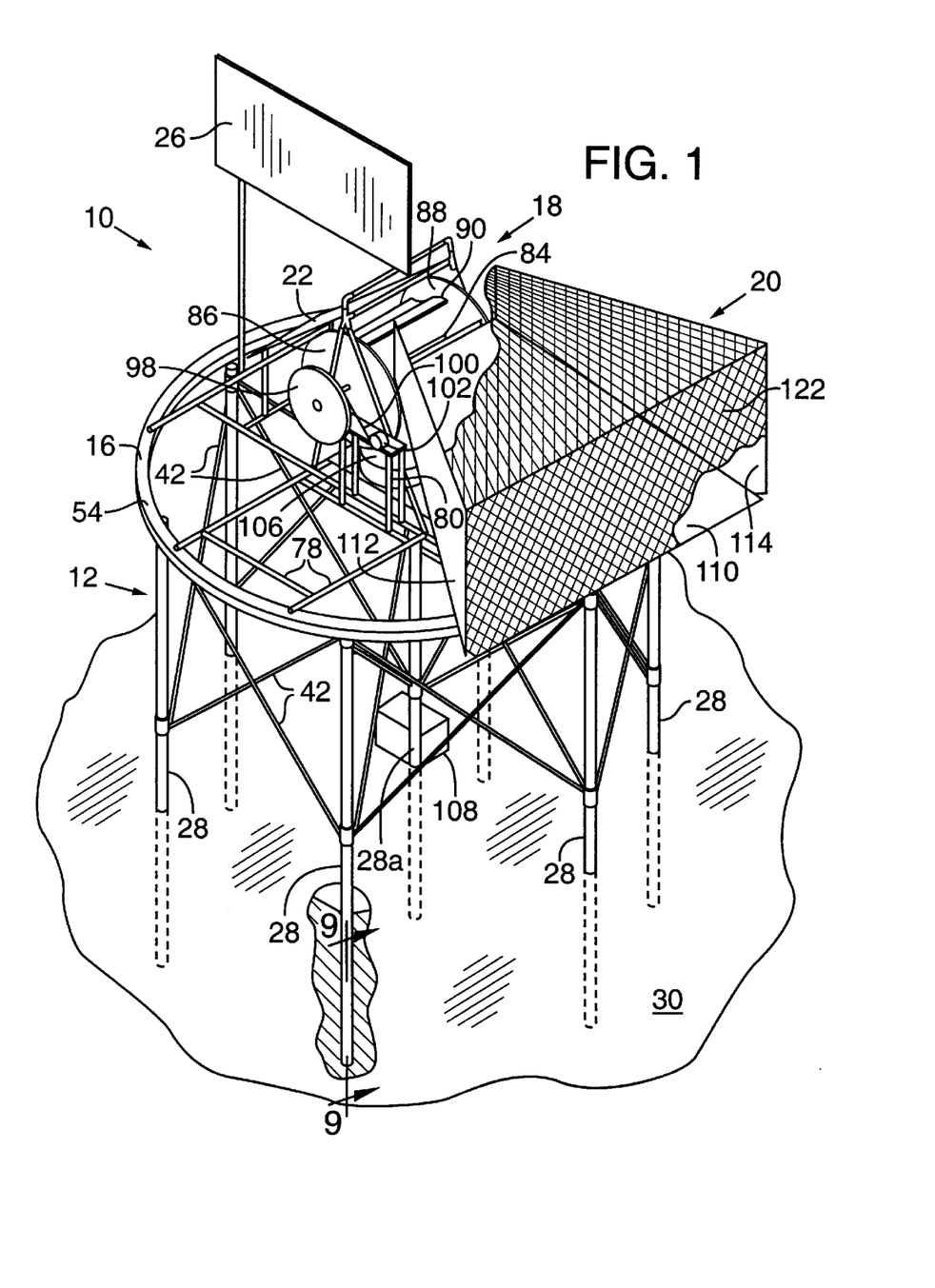
FIG. 1 is a perspective view of a wind-powered machine constructed according to a preferred embodiment of the present invention.
Figure 2:
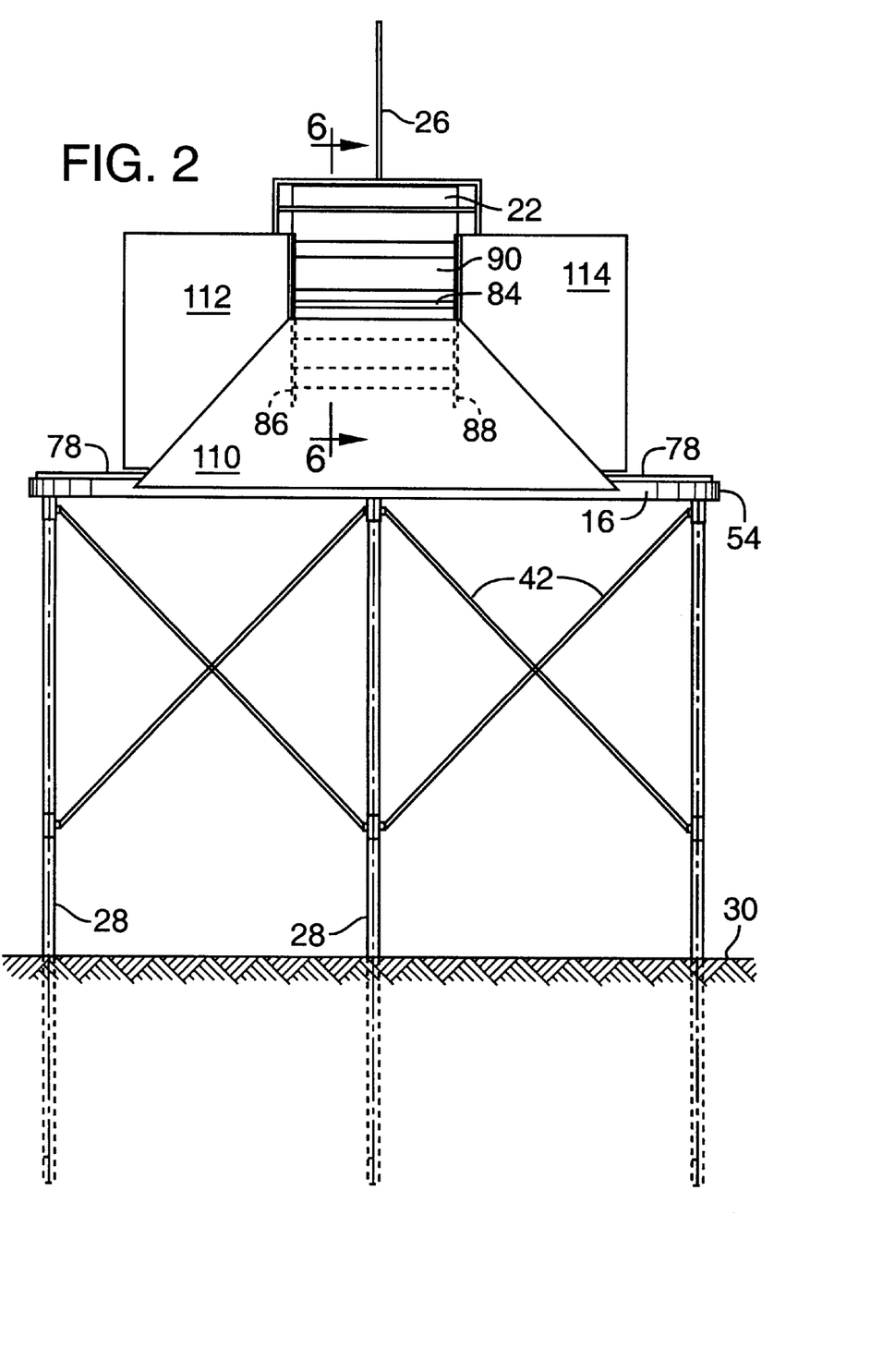
FIG. 2 is a front elevation view of the machine of FIG. 1, with screening material over an infeed funnel therein removed.
Figure 3:
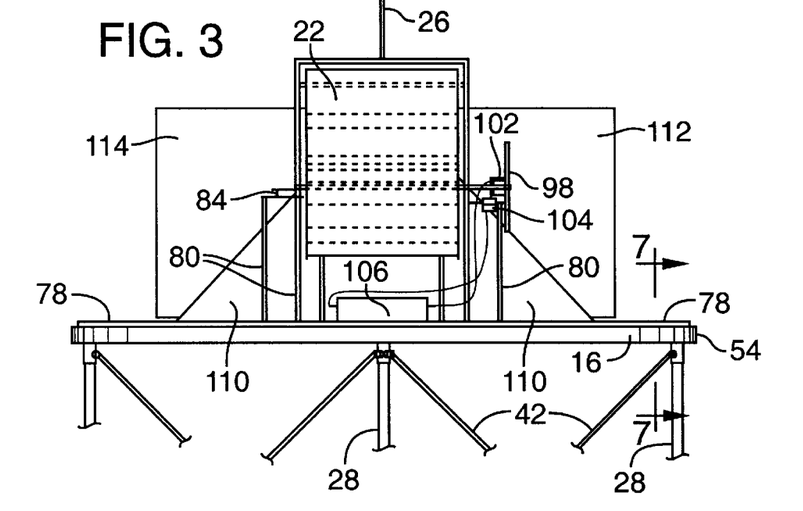
FIG. 3 is a rear elevation view of upper portions of the machine.

After the post is thus prepared cementitious material, such as concrete, 40 is poured into the top of the post to fill the post. During the filling process a concrete vibrator is attached to the centered reinforcing bar 38 to vibrate and settle this cementitious material as it enters the post. After the post is filled with cementitious material the reinforcing bar is driven by hammer to seat it in the bottom of sleeve 36. The casing, or post, then is embedded in the ground as illustrated in FIGS. 1 and 2, with approximately 25 to 30 feet of the post extending above ground level. The posts are disposed in a somewhat polygonal configuration with a center post 28a in the middle thereof.

A plurality of diagonal cross braces 42 extend between the posts to provide a substantially rigid structure.

Turntable 16 is supported atop the posts 28. The turntable comprises an annular structure comprising a pair of overlying annular rings, which will be described in greater detail below.

Figure 7:
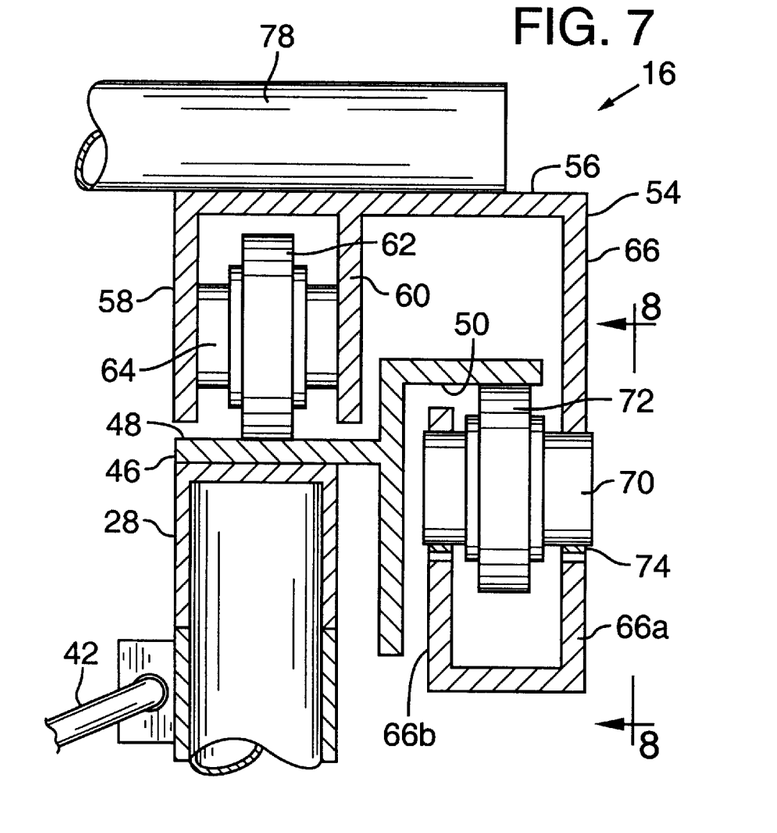
FIG. 7 is an enlarge cross-sectional view of a portion of the turntable mounting in the machine taken generally along the lines 7—7 in FIG. 3.

Referring to FIG. 7, a horizontally disposed annular first member, or ring, 46 is mounted atop post 28. Ring 46 has a cross-sectional configuration as illustrated generally in FIG. 7 which produces an annular upper face surface 48 and an annular lower face surface 50.

The turntable also includes a horizontally disposed annular second member, or ring, 54 having a cross-sectional configuration illustrated generally in FIG. 7. Ring member 54 has a substantially horizontally disposed annular main support portion 56. Depending from portion 56 and overlying upper face surface 48 are a pair of annular side supports 58, 60. A roller, caster, or bearing, 62 is rotationally supported on an axle 64 extending between supports 58, 60 and rides atop upper face surface 48.

Figure 8:
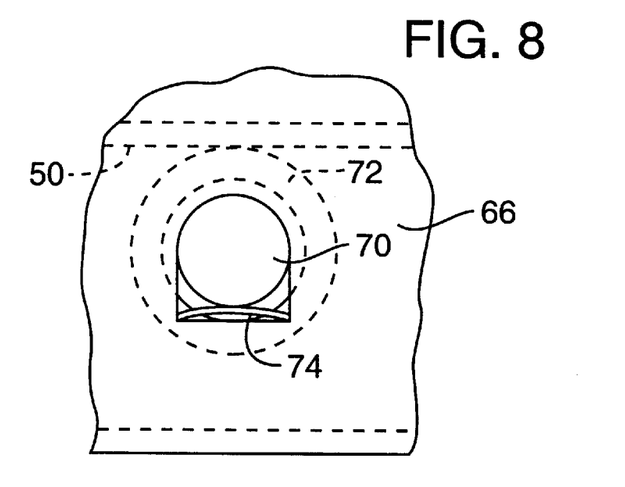
FIG. 8 is a view taken generally along the lines 8—8 in FIG. 7 showing a spring mounting for a roller in the turntable assembly.

A depending J-shaped support 66 having vertically disposed support portions 66a, 66b, depends from the outer edge of support portion 46. Support portions 66a, 66b support an axle 70 on which a roller, caster, or bearing, 72 is rotatability mounted to engage the lower face surface 50. Referring to FIGS. 7 and 8, side portions 66a, 66b have enlarged openings through which axle 70 extends and each has a leaf spring 74 underlying the axle to yieldably support roller 72. The roller thus is urged upwardly against the lower face surface 50 to maintain contact therebetween throughout operation.

It should be recognized that there are plurality of rollers 62, 72 supported as illustrated in FIG. 7 and spaced circumferentially about annular second ring member 54. These rollers engage annular first member 48 to permit rotation of the turntable relative to the underlying support 12.

A plurality of cross members, such as that indicated generally at 78 are supported atop ring member 54 to support working structure thereon.

Projecting upwardly from cross members 78 are upright supports 80 on which rotor 18 is mounted for rotation with the turntable. The rotor has a central axle 84 and a pair of substantially planar, spaced apart, enclosing sides 86, 88. The rotor also has a plurality of vanes, or fins, 90 which extend substantially parallel to axle 84, and thus the axis are rotation of the rotor, and between enclosing sides 86, 88.

Figure 6:
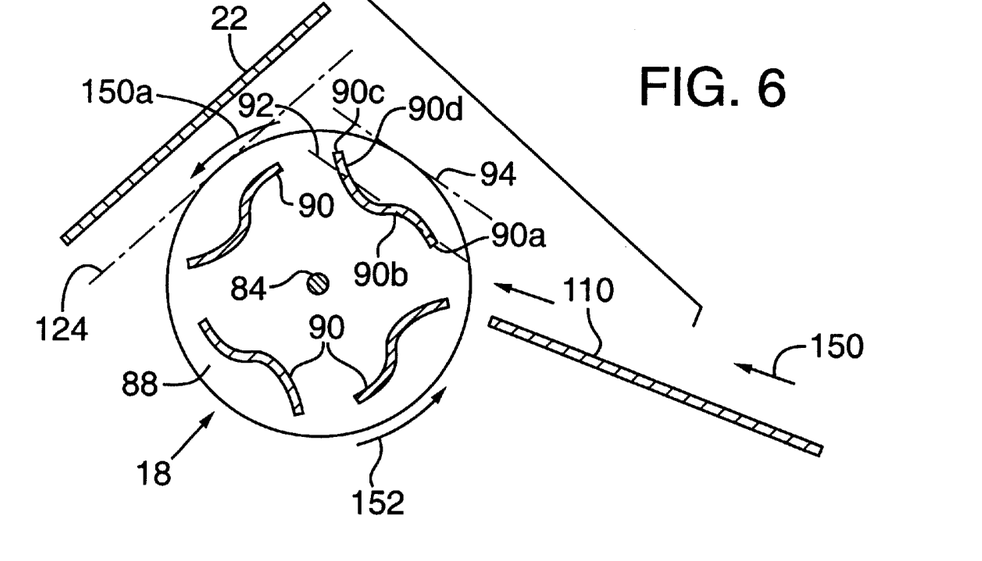
FIG. 6 is a cross-sectional view of a rotor in the machine taken generally along the line 6—6 in FIG. 2.

Referring to FIG. 6, the vanes, as viewed in cross section along a line paralleling the axis of rotation of axle 84 have a substantially sinusoidal configuration. The first edge 90a is followed by a concave radially inwardly facing surface portion 90b. The second opposed edge 90c is preceded, or led, by a concave radially outwardly facing surface 90d. The axis of the sinusoidal shape is indicated generally at 92 and, as best seen in FIG. 6, is substantially parallel to a line 94 tangent to the periphery of the rotor. A plurality of such vanes are spaced apart circumferentially about the rotor.

Figure 6A:
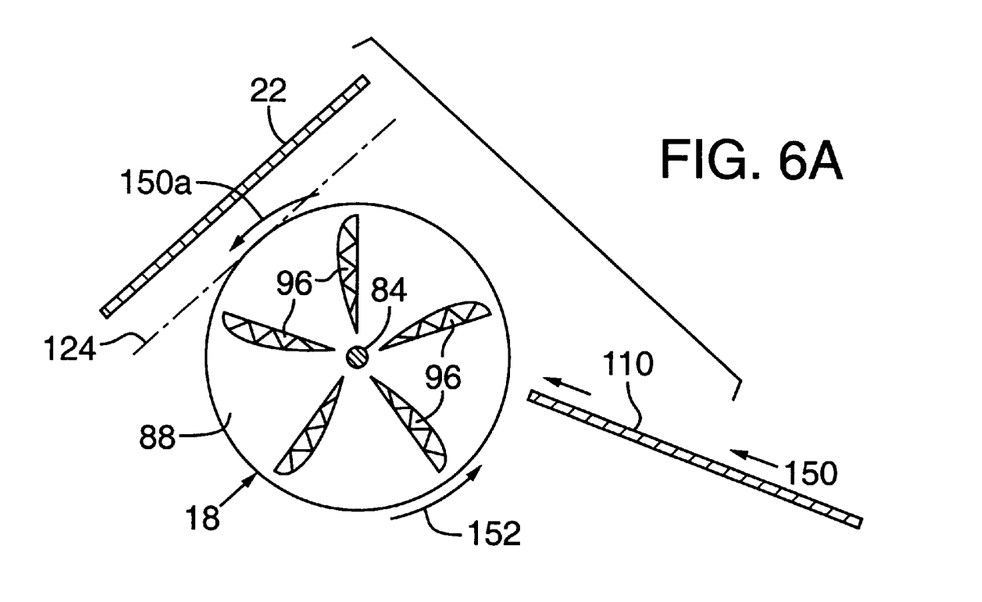
FIG. 6A is view similar to FIG. 6, but with the different vanes in the rotor.

A modified embodiment of the rotor is illustrated in FIG. 6A. Here, a plurality of vanes 96 have generally airfoil-shaped cross sections with their leading edges directed substantially radially outwardly in the rotor and their trailing edges directed radially inwardly.

A drive pulley 98 is secured to one end of axle 84 and, operating through a drive belt 100, turns an electrical generator, or alternator, 102. Electrical power produced by the alternator, or generator, 102 is transmitted through a voltage regulator 104 and a rotating connector 106 to transmission means or to a storage medium, such as battery 108. The rotating connector will be described in greater detail below.

Infeed funnel 20 in the illustrated embodiment comprises three planar panels 110, 112, 114. The lower panel 110 progresses upwardly from its outer end at an angle toward rotor 18 and has opposed side edges which converge on progressing toward the rotor. Spaced, opposed upright sides 112, 114 are secured at their lower edge margins to outer side edges of panel 110 and converge as they progress from the outer end of the funnel toward rotor 18. This structure provides a funnel-shaped structure having a substantially wide inlet mouth spaced from the rotor and a smaller wind directing opening adjacent the face side of the rotor to channel wind to the rotor and increase the speed of the wind channel to the rotor. As illustrated in FIG. 1, screening material 122 is stretched across open areas of the infeed funnel to prevent wind carried items, such as debris and birds from moving through the funnel to the rotor.

As best seen in FIGS. 6 and 6A the funnel lower panel 110 is directed upwardly toward the upper portions of the rotor to direct wind flow in that direction.

Figure 4:
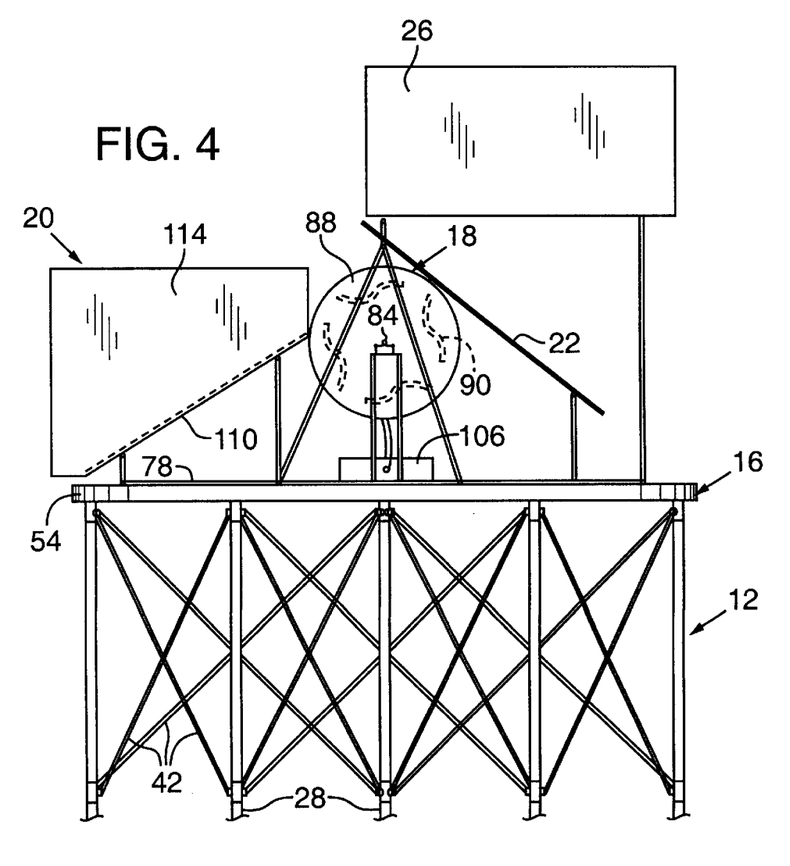
FIG. 4 is a side elevation view of the machine.
Figure 5:
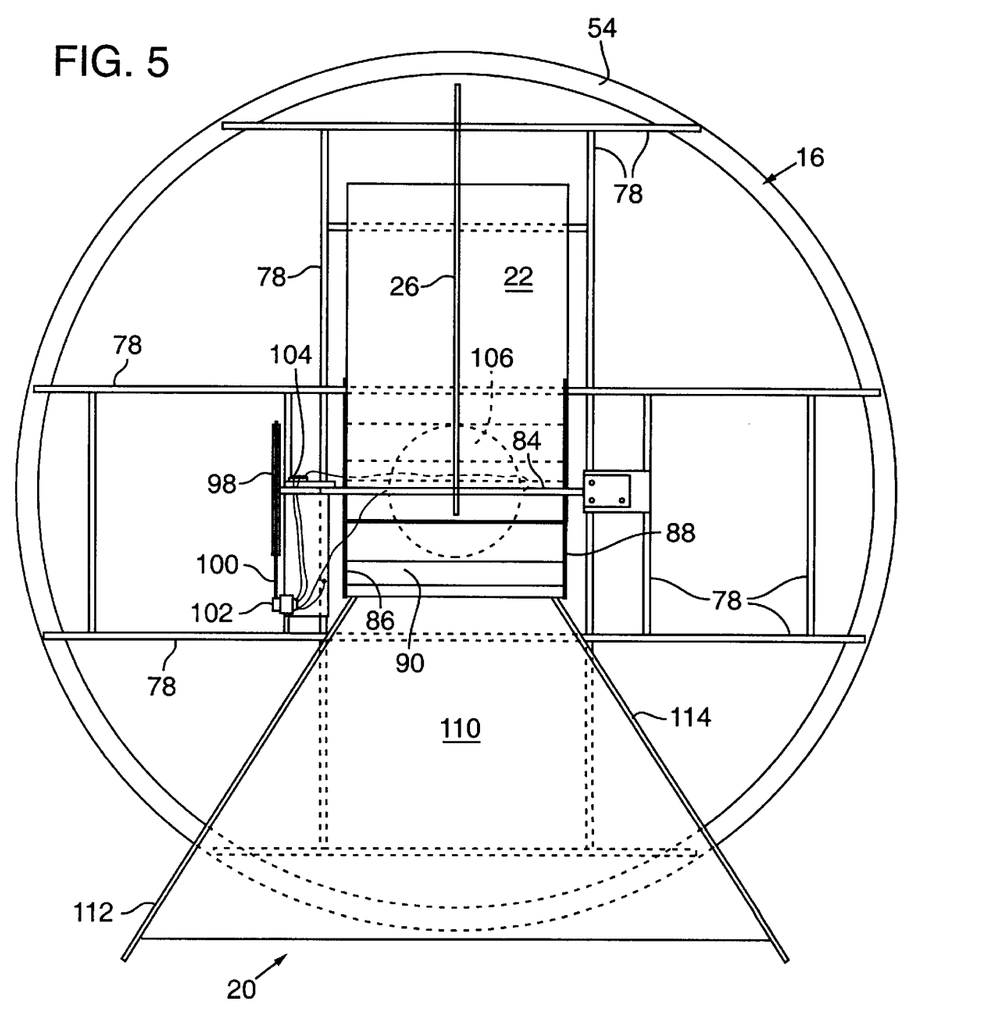
FIG. 5 is a top plan view of the machine.

The rear wind deflector 22 as best seen in FIGS. 4, 6 and 6A is a planar panel, which is disposed at an angle over the rear side of the rotor. Its forward end overlies the top of the rotor and remainder portions thereof extend downwardly at an angle adjacent the rear side, or face, of the rotor. The rear wind deflector lies in a plane substantially parallel to the rotor axis provided by axle 84 and is spaced outwardly from, but substantially parallel to, a line 124 tangent to the periphery of the rotor.

Fin 26 is an upright planar panel supported above the rotor and rear deflector, rearwardly of the rotor and in line with a wind directing axis of the infeed funnel. The fin is secured to the turntable, such that it is affected by wind blowing toward the machine to maintain the infeed mouth of the infeed funnel directed toward an incoming wind stream.

Figure 11:
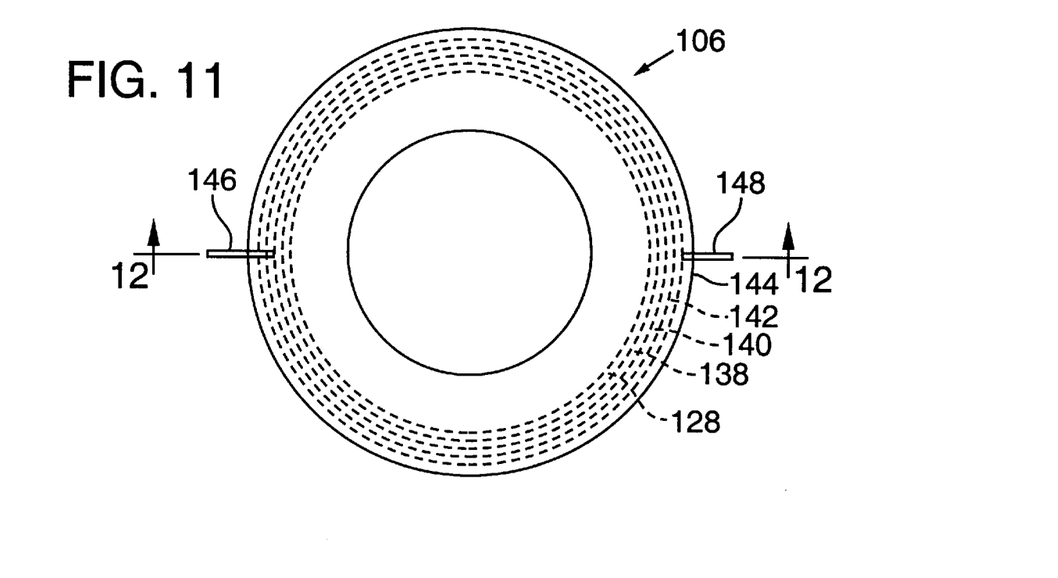
FIG. 11 is a top plan view of an electrical connection rotator coupling underlying the rotor.
Figure 12:
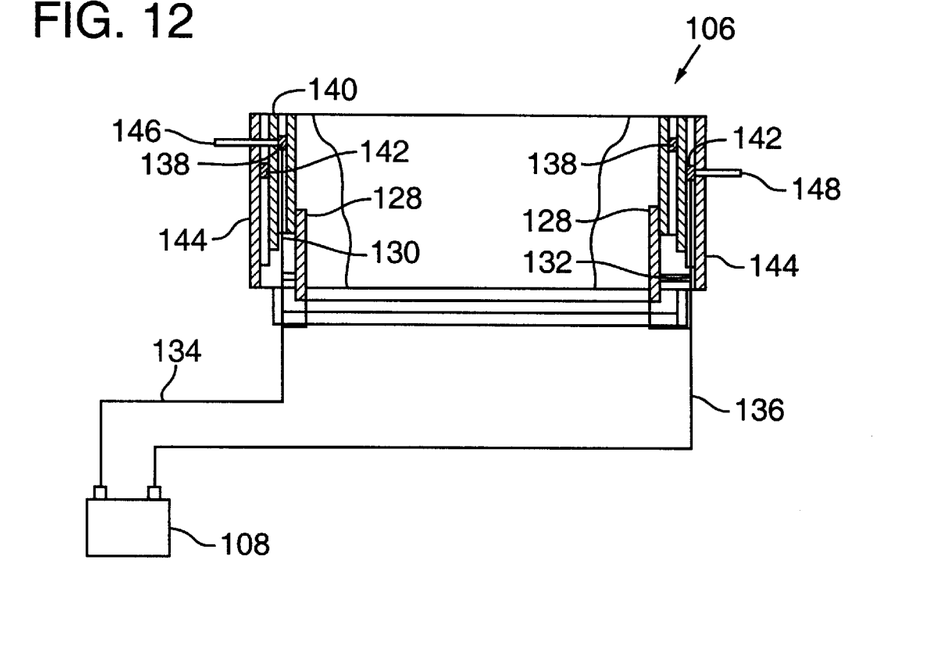
FIG. 12 is a view taken generally along the line 12—12 in FIG. 11.

Referring to FIGS. 11 and 12, the electrical rotator connector 106 includes a plurality of concentric annular rings, which are mounted for rotation relative to each other. It should be recognized that the construction illustrated is generally schematic to show the relative positions and movements of the parts and various structural modifications may be made.

A first inner ring 128 of electrically non-conductive material is secured to the underlying support frame and remains stationary during operation. Similarly, a pair of electrically conductive wipers illustrated schematically at 130, 132 are secured to stationary inner ring 128 adjacent the lower portion thereof and extend upwardly from their supports. The wipers 130, 132 are connected through conductors, or wires, 134, 136 to battery 108.

A first annular conductor ring 138 is secured to a radially inwardly facing side of a non-conducting annular ring 140, mounted for rotation about stationary ring 128. Conductor ring 138 is position to engage the upper end of wiper 130.

A second annular conductor ring 142 is secured to the radially outwardly facing side of non-conductive ring 140, engages the upper end of wiper 132, and is rotatable with ring 140 about stationary ring 128. A protective non-conductive annular housing ring 144 rotatable with ring 140 extends about rings 140, 142. Electrical connectors 146, 148 are secured to conductor rings 138, 142, respectively and are electrically connected to generator, or alternator, 102. As the alternator is driven by the wind powered rotor electricity may pass through connectors 146, 148 to conductor rings 138, 140, respectively, through wipers 130, 132 to conductors 134, 136 to transmit electrical energy to the storage battery. The relative rotation of the rings described permits electrically interconnection to be maintained throughout rotation of the rotor and funnel relative to the underlying support structure.

Describing operation of the wind powered machine of the invention, the support frame provides a stable and durable support for the machine in a position above ground where it may capture wind. Fin 26 turns the operating equipment about an upright pivot axis through the operation of the turntable to direct the mouth of funnel 20 into the wind. The funnel channels wind and increases its speed as it approaches the rotor. The wind follows a course generally as indicated at 150 angled somewhat upwardly toward the face side of the rotor to impinge upon the leading portion of a vane and turn the rotor in the direction indicated at 152. Due to the concave radially inwardly facing portion 90b of the rotor in FIG. 6 wind will catch under the leading portion of the rotor and provide good rotational energy.

As the vane rotates to the rear side of the rotor wind as indicated at 150a deflected downwardly by deflector 22 can engage the concave radially outwardly facing portion 90d of the vane and provide additional rotational force.

In the case of air-foil shaped vanes as indicated in FIG. 6A, as wind approaches the front of the vane, a lift function is provided, much like the wing of an aircraft, to cause the rotor to turn in the rotational direction 152. As the rotor rotates in direction 152 wind impinges on the underside of the airfoil.

Wind-powered rotation of the rotor drives alternator 102 which transmits electrical energy through rotating connector 106 to storage batteries, such as that indicated generally 108.

While a preferred embodiment of the invention has been described herein, it should be apparent to those skilled in the art that variations and modifications are possible without departing from the spirit of the invention as set out in the following claims.

What is claimed is:

1. A wind powered machine for producing energy comprising
   a support frame,
   a rotor mounted on the frame for rotation about a substantially horizontal rotor axis, said rotor having a plurality of vanes spaced apart circumferentially about the rotor axis, said rotor having a wind gathering face side and an opposed rear side, and said rotor comprises a pair of laterally spaced opposed enclosing sides and at least one of said vanes on the rotor extends between said sides and has a cross sectional configuration as viewed along a line parallel to the rotor axis which is sinusoidal,
   an infeed funnel having a wide inlet mouth spaced outwardly from the rotor for receiving a wind at an infeed speed and sides which converge on progressing from the inlet mouth to a smaller wind directing opening adjacent the face side of the rotor to channel said wind to the rotor and increase the speed of the wind channeled to the rotor above the infeed speed,
   a rear wind deflector member overlying the rear side of the rotor to capture wind passing over the rotor and deflect it downwardly to vanes on the rear side of the rotor,
   a pivot mounting the rotor and the infeed funnel for rotation about a substantially upright axis, and
   a positioning fin operatively coupled to the rotor and infeed funnel to be acted upon by the wind to direct the inlet mouth toward an incoming wind.

2. The machine of claim 1, wherein said one vane has a first edge disposed adjacent a peripheral edge of the rotor and the sinusoidal configuration of the vane has a longitudinal axis which is generally parallel to a line tangent to the peripheral edge of the rotor.

3. A wind powered machine for producing energy comprising
   a support frame,
   a rotor mounted on the frame for rotation about a substantially horizontal rotor axis, said rotor having a plurality of vanes spaced apart circumferentially about the rotor axis, said rotor having a wind gathering face side and an opposed rear side,
   an infeed funnel having a wide inlet mouth spaced outwardly from the rotor for receiving a wind at an infeed speed and sides which converge on progressing from the inlet mouth to a smaller wind directing opening adjacent the face side of the rotor to channel said wind to the rotor and increase the speed of the wind channeled to the rotor above the infeed speed,
   a rear wind deflector member overlying the rear side of the rotor to capture wind passing over the rotor and deflect it downwardly to vanes on the rear side of the rotor,
   a pivot mounting the rotor and the infeed funnel for rotation about a substantially upright axis,
   a positioning fin operatively coupled to the rotor and infeed funnel to be acted upon by the wind to direct the inlet mouth toward an incoming wind,
   at least one of said vanes has a first edge followed in the direction of rotor rotation by a radially inwardly facing concave surface adapted to be acted upon by said wind directed to the rotor by the funnel and a second edge led by a radially outwardly facing concave surface adapted to be acted upon by said wind directed to the rotor by the rear wind deflector.

4. A wind powered machine for producing energy comprising
   a support frame,
   a rotor mounted on the frame for rotation about a substantially horizontal rotor axis, said rotor having a plurality of vanes spaced apart circumferentially about the rotor axis, said rotor having a wind gathering face side and an opposed rear side, an infeed funnel having a wide inlet mouth spaced outwardly from the rotor for receiving a wind at an infeed speed and sides which converge on progressing from the inlet mouth to a smaller wind directing opening adjacent the face side of the rotor to channel said wind to the rotor and increase the speed of the wind channeled to the rotor above the infeed speed, a rear wind deflector member overlying the rear side of the rotor to capture wind passing over the rotor and deflect it downwardly to vanes on the rear side of the rotor, a pivot mounting the rotor and the infeed funnel for rotation about a substantially upright axis, said pivot mounting comprising a horizontally disposed annular first member having upper and lower face surfaces, a horizontally disposed second member contiguous said first member, and bearing means interposed between the second member and the upper and lower face surfaces of the first member to support the second member against vertical movement relative to the first member but allowing rotation of the second member relative to the first member about said upright axis, said bearing means including a plurality of upper rollers interposed between the second member and the upper face surface of the first member and a plurality of lower rollers interposed between the second member and the lower face surface of the first member, and biasing means urging at least one of said rollers into engagement with an associated surface of the first member, and a positioning fin operatively coupled to the rotor and infeed funnel to be acted upon by the wind to direct the inlet mouth toward an incoming wind.

5. A wind powered machine for producing energy comprising a support frame, comprising a plurality of upright supports, at least one of said supports comprising an elongate hollow post filled with cementitious material and having a reinforcing rod extending longitudinally therethrough, said post having a substantially horizontally disposed planar base plate secured to its lowermost end, and a sleeve secured to and extending upwardly from the base plate, and said reinforcing rod is received in said sleeve and coupled to the base plate, a rotor mounted on the frame for rotation about a substantially horizontal rotor axis, said rotor having a plurality of vanes spaced apart circumferentially about the rotor axis, said rotor having a wind gathering face side and an opposed rear side, an infeed funnel having a wide inlet mouth spaced outwardly from the rotor for receiving a wind at an infeed speed and sides which converge on progressing from the inlet mouth to a smaller wind directing opening adjacent the face side of the rotor to channel said wind to the rotor and increase the speed of the wind channeled to the rotor above the infeed speed, a rear wind deflector member overlying the rear side of the rotor to capture wind passing over the rotor and deflect it downwardly to vanes on the rear side of the rotor, a pivot mounting the rotor and the infeed funnel for rotation about a substantially upright axis, and a positioning fin operatively coupled to the rotor and infeed funnel to be acted upon by the wind to direct the inlet mouth toward an incoming wind.

6. The machine of claim 5, wherein said reinforcing rod is disposed to act as a vibration transmitting mechanism for vibrating cementitious material as it is deposited in the post.

7. The machine of claim 5, wherein said pivot mounting is secured to upper end portions of said supports.

8. A wind powered machine for producing energy comprising a support frame, a rotor mounted on the frame for rotation about a substantially horizontal rotor axis, said rotor having a plurality of vanes spaced apart circumferentially about the rotor axis, said rotor having a wind gathering face side and an opposed rear side, and further comprising a pair of laterally spaced opposed enclosing sides and at least one of said vanes extends between said sides and has a cross sectional configuration as viewed along a line parallel to the rotor axis which is sinusoidal, an infeed funnel having a wide inlet mouth spaced outwardly from the rotor for receiving a wind at an infeed speed and sides which converge on progressing from the inlet mouth to a smaller wind directing opening adjacent the face side of the rotor to channel said wind to the rotor and increase the speed of the wind channeled to the rotor above the infeed speed, a rear wind deflector member overlying the rear side of the rotor to capture a wind passing over the rotor and deflect it downwardly to vanes on the rear side of the rotor, said rear wind deflector comprising a plate member having a front part overlying a top portion of said rotor and remainder portions extending downwardly at an angle adjacent the rear side of the rotor, a pivot mounting the rotor and said infeed funnel for rotation about a substantially upright axis wherein said pivot mounting comprises a horizontally disposed annular first member having upper and lower face surfaces, a horizontally disposed annular second member contiguous said first member, and bearing means interposed between the second member and the upper and lower face surfaces of the first member to support the second member against vertical movement relative to the first member but allowing rotation of the second member relative to the first member about said upright axis, and a positioning fin operatively coupled to the rotor and said infeed funnel to be acted upon by the wind to direct the inlet mouth toward an incoming wind.

9. The machine of claim 8, wherein said one vane has a first edge followed in the direction of rotor rotation by a radially inwardly facing concave surface adapted to be acted upon by wind directed to the rotor by the funnel and a second edge led by a radially outwardly facing concave surface adapted to be acted upon by wind directed to the rotor by the rear wind deflector.

10. A wind powered machine for producing energy comprising a support frame, a rotor having a wind gathering face side and an opposed rear side mounted on the frame for rotation about a first axis of rotation, said rotor comprising a pair of laterally spaced opposed enclosing sides and a plurality of vanes spaced apart circumferentially about the first axis and extending substantially parallel to said first axis, and at least one of said vanes on the rotor extends between said sides and has a cross sectional configuration as viewed along a line parallel to the first axis which is sinusoidal, an infeed funnel having a wide inlet mouth spaced outwardly from the rotor for receiving a wind at an infeed speed and sides which converge on progressing from the inlet mouth to a smaller wind directing opening adjacent the face side of the rotor to channel a wind to the rotor and increase the speed of the wind channeled to the rotor above the infeed speed, a rear wind deflector member opposite said infeed funnel disposed to capture a wind passing over the rotor and deflect a portion thereof to vanes on the rear side of the rotor, turntable means supporting said rotor, said infeed funnel and said rear wind deflector on the support frame permitting rotation thereof about a substantially upright pivot axis and positioning means for turning the turntable to direct the inlet mouth toward an incoming wind.

11. The machine of claim 10, wherein a vane has a first edge disposed adjacent the periphery of the rotor and the axis of the sinusoidal shape is generally parallel to a line tangent to the periphery of the rotor.

12. A wind powered machine for producing energy comprising a support frame, a rotor mounted on the frame for rotation about a first axis of rotation, said rotor having a plurality of vanes spaced apart circumferentially about the first axis and extending substantially parallel to said first axis, said rotor having a wind gathering face side and an opposed rear side, and an infeed funnel having a wide inlet mouth spaced outwardly from the rotor for receiving a wind at an infeed speed and sides which converge on progressing from the inlet mouth to a smaller wind directing opening adjacent the face side of the rotor to channel a wind to the rotor and increase the speed of the wind channeled to the rotor above the infeed speed, a rear wind deflector member opposite said infeed funnel disposed to capture a wind passing over the rotor and deflect a portion thereof to vanes on the rear side of the rotor, turntable means supporting said rotor, said infeed funnel and said rear wind deflector on the support frame permitting rotation thereof about a substantially upright pivot axis, and positioning means for turning the turntable to direct the inlet mouth toward an incoming wind, at least one of said vanes has a first edge followed in the direction of rotor rotation by a radially inwardly facing concave surface adapted to be acted upon by wind directed to the rotor by the funnel and a second edge led by a radially outwardly facing concave surface adapted to be acted upon by wind directed to the rotor by the rear wind deflector.

13. A wind powered machine for producing energy comprising a support frame, a rotor mounted on the frame for rotation about a first axis of rotation, said rotor having a plurality of vanes spaced apart circumferentially about the first axis and extending substantially parallel to said first axis, said rotor having a wind gathering face side and an opposed rear side, and an infeed funnel having a wide inlet mouth spaced outwardly from the rotor for receiving a wind at an infeed speed and sides which converge on progressing from the inlet mouth to a smaller wind directing opening adjacent the face side of the rotor to channel a wind to the rotor and increase the speed of the wind channeled to the rotor above the infeed speed, a rear wind deflector member opposite said infeed funnel disposed to capture a wind passing over the rotor and deflect a portion thereof to vanes on the rear side of the rotor, turntable means supporting s aid rotor, said infeed funnel and said rear wind deflector on the support frame permitting rotation thereof about a substantially upright pivot axis, said turntable means comprising a horizontally disposed annular first member having upper and lower face surfaces, a horizontally disposed annular second member contiguous said first member, and bearing means interposed between the second member and the upper and lower face surfaces of the first member to support the second member against vertical movement relative to the first member but allowing rotation of the second member relative to the first member about said upright axis, said bearing means comprising a plurality of upper rollers interposed between the second member and the upper face surface of the first member and a plurality of lower rollers interposed between the second member and the lower face surface of the first member, and biasing means urging at least one of said rollers into engagement with its associated surface of the first member, and positioning means for turning the turntable to direct the inlet mouth toward an incoming wind.

* * * * *

UNITED STATES PATENT AND TRADEMARK OFFICE
CERTIFICATE OF CORRECTION

PATENT NO. : 6,239,507 B1
DATED : May 29, 2001
INVENTOR(S) : Harry Douthit

It is certified that error appears in the above-identified patent and that said Letters Patent is hereby corrected as shown below:

Column 1,
Line 6, "with" should be -- which --.
Line 45, "view" should be -- viewed --.

Column 2,
Line 18, "enlarge" should be -- enlarged --.

Column 3,
Line 66, "the axis are" should be -- parallel to the axis of --.

Column 5,
Line 10, "position" should be -- positioned --.
Line 24, "electrically interconnection" should be -- electrical connection --.

Column 10,
Line 26, "s aid" should be -- said --.

Signed and Sealed this

Twenty-sixth Day of February, 2002

Attest:

JAMES E. ROGAN
*Attesting Officer*   *Director of the United States Patent and Trademark Office*